United States Patent [19]

Clark

[11] 4,271,071
[45] Jun. 2, 1981

[54] HETEROCYCLIC MONOAZO COMPOUNDS FROM ALKYL-3-(PHENYLAMINO)BUTYRATES

[75] Inventor: Gary T. Clark, Kingsport, Tenn.

[73] Assignee: Eastman Kodak Company, Rochester, N.Y.

[21] Appl. No.: 63,642

[22] Filed: Aug. 2, 1979

[51] Int. Cl.$^3$ ............................................. C07C 29/08
[52] U.S. Cl. ..................................... 260/157; 260/158; 260/163
[58] Field of Search ........................ 260/158, 163, 157

[56] References Cited

U.S. PATENT DOCUMENTS

| | | | |
|---|---|---|---|
| 2,683,708 | 7/1954 | Dickey et al. | 260/158 |
| 3,619,108 | 11/1971 | Peter et al. | 260/158 X |
| 3,632,565 | 1/1972 | Angliker et al. | 260/152 |
| 3,637,653 | 1/1972 | Brachel et al. | 260/207 |
| 3,639,384 | 2/1972 | Weaver et al. | 260/152 |
| 3,658,784 | 4/1972 | Lange | 260/158 |
| 3,821,194 | 6/1974 | Peter et al. | 260/207 |
| 4,087,420 | 5/1978 | Heinrich et al. | 260/207 |
| 4,105,653 | 8/1978 | Brouard et al. | 260/158 |
| 4,111,930 | 9/1978 | Meybeck | 260/207.5 |

FOREIGN PATENT DOCUMENTS

| | | | |
|---|---|---|---|
| 2028457 | 12/1970 | Fed. Rep. of Germany | 260/158 |
| 2004131 | 8/1971 | Fed. Rep. of Germany | 260/158 |
| 2613595 | 10/1976 | Fed. Rep. of Germany | 260/158 |
| 1060240 | 3/1967 | United Kingdom | 260/158 |
| 1428115 | 3/1976 | United Kingdom | 260/158 |
| 1448782 | 9/1976 | United Kingdom | 260/158 |

OTHER PUBLICATIONS

Derwent Japanese Patents Report, 5, No. 42, p. 2:6, (11/22/66).

*Primary Examiner*—John Doll
*Attorney, Agent, or Firm*—Donald W. Spurrell; Daniel B. Reece, III

[57] ABSTRACT

Monoazo compounds having a heterocyclic diazo component and an alkyl-3-(phenylamino)butyrate are useful as dyes for synthetic fibers such as cellulose acetate, cellulose triacetate, Nylon and especially polyester. The dyes of this invention have excellent fastness and dyeing properties by either heat fixation or exhaust, boil or pressure, methods of application. These novel compounds have the structure.

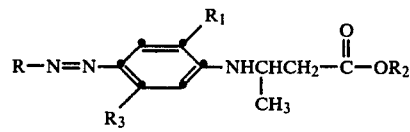

wherein, for example,
R is a heterocyclic component,
$R_1$ is hydrogen, lower alkyl, or lower alkoxy,
$R_2$ is lower alkyl, and
$R_3$ is hydrogen, lower alkyl, lower alkoxy, or lower alkanoylamino, and the various alkyl moieties may be substituted.

11 Claims, No Drawings

HETEROCYCLIC MONOAZO COMPOUNDS FROM ALKYL-3-(PHENYLAMINO)BUTYRATES

This invention relates to certain novel, water-insoluble monoazo compounds and, more particularly, to dyes for synthetic fibers such as cellulose acetate, cellulose triacetate, Nylon and especially polyester. The novel azo compounds of this invention have the formula

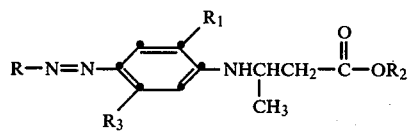

wherein

R is a heterocyclic radical which may be substituted, selected from 2-thiazolyl, 2-benzothiazolyl, 3-benzoisothiazolyl, 1,3,4-thiadiazol-2-yl, 1,2,4-thiadiazol-5-yl, 3-pyrazolyl, 2-thienyl, and 5-isothiazolyl;

$R_1$ is hydrogen, lower alkyl, or lower alkoxy;

$R_2$ is lower alkyl, cyclohexyl, benzyl, or phenyl;

$R_3$ is hydrogen, lower alkyl, lower alkoxy, alkanoylamino wherein the alkanoyl moiety is either straight or branched alkyl of 1–12 carbon atoms, aroylamino, or cyclohexyl carbonylamino; and wherein each of the alkyl moieties may be substituted with 1–3 of lower alkoxy, —O—C$_2$H$_4$—O—C$_2$H$_4$O—lower alkyl,

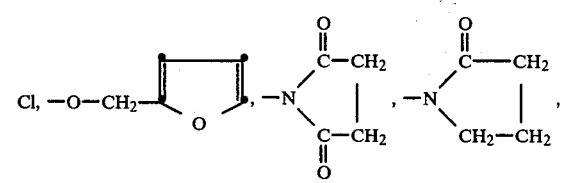

phenoxy, cyclohexyl, cyclohexyloxy, NHCO-lower alkyl, -N(lower alkyl)$_2$, acyloxy,

-S-lower alkyl, or —SO$_2$ lower alkyl.

The term "lower" as used herein means 1–6 carbons. The particular configuration of applicant's coupler N-substituent gives marked improvements over ostensibly close dyes, e.g., of U.S. Pat. No. 2,683,708.

The dyes of this invention impart bright yellow to blue shades to synthetic fibers such as nylon, cellulose acetate, cellulose triacetate, and especially polyester. These dyes have excellent light, wash, crock, gas, acid or basic perspiration, and sublimation fastness on particular substrates. Our dyes exhibit excellent pH stability over a range of 4–10 when applied to polyester above the boil (220°–275° F.) and the above fibers. The build-up characteristics or color yield, exhaustion of dye onto the fiber, pH stability, stability to dry heat (blooming), and rate of dyeing of these dyes are superior to dyes with close chemical structure. The good reproducibility of these dyes is reflected in their leveling (migration) and barre coverage abilities on polyester fabrics. From the above properties, these dyes have excellent shade reproducibility by all methods of application (boil, pressure, heat fixation) on polyester fibers.

The heterocyclic diazo component R can be unsubstituted or, preferably, substituted with, for example, 1 to 3 of lower alkyl, lower lkoxy, aryl, nitro, halogen, lower alkylthio, lower alkoxycarbonylalkylthio, cyclohexylthio, arylthio, lower aralkylthio, formyl, lower alkanoyl, lower alkoxycarbonyl, aroyl, lower alkanoylamino, aroylamino, cyano, lower alkylsulfonyl, arylsulfonyl, lower alkylsulfonamido, trifluoromethyl, sulfamoyl, lower alkylsulfamoyl, carbamoyl, lower alkylcarbamoyl, thiocyanato, and the like. The alkanoyl groups can be substituted with substituents including halogen, phenyl, cyano, lower alkoxy, lower alkylthio, and lower alkylsulfonyl. The alkylsulfonyl groups can also be substituted, for example, with cyano, hydroxy, halogen and the like. The alkoxycarbonyl groups can be substituted, for example, with hydroxy or cyano. Exemplary of the alkyl and alkoxy groups which can be present on the diazo components are methyl, ethyl, isopropyl, propyl, butyl, methoxy, etoxy, propoxy, and butoxy. Chlorine and bromine are preferred halogen atoms. Methylsulfonyl, ethylsulfonyl, propylsulfonyl, butylsulfonyl, 2-cyanoethylsulfonyl, 2-hydroxyethylsulfonyl, acetyl, propionyl, butyryl, isobutyryl, 3-chloropropionyl, cyanoacetyl, methoxycarbonyl, ethoxycarbonyl, propoxycarbonyl, 2-cyanoethoxycarbonyl, and 2-hydroxyethoxycarbonyl are examples of the alkylsulfonyl, alkanoyl, and alkoxycarbonyl groups which can be present on the heterocyclic diazos.

Acetamido, propionamido, methylsulfonamido, ethylsulfonamido, and butylsulfonamido are typical alkanoylamino and alkylsulfonamido substituents which can be present on the diazo component. Dimethylsulfamoyl, ethylsulfamoyl, butylsulfamoyl, diethylcarbamoyl, propylcarbamoyl, dibutylcarbamoyl are examples of the alkylsulfamoyl and alkylcarbamoyl groups. The aroyl groups which can be present on the diazo component including the aryl moiety of the arylthio, aralkylthio, aroyl and arylsulfonyl groups are preferably monocyclic, carbocyclic aryl such as phenyl and phenyl substituted, for example, with lower alkyl, e.g. tolyl; lower alkoxy, e.g. anisyl; halogen, e.g. chlorophenyl, and bromophenyl. Benzoyl, p-toloyl, p-chlorobenzoyl, p-nitrobenzoyl, p-ethoxyphenylthio, p-chlorobenzylthio, benzamido, p-tolylamino, p-tolylsulfonyl, and p-ethoxyphenylsulfonyl are examples of the aryl-containing groups which can be present on the heterocyclic diazos.

Typical R radicals are 2-thiazolyl, 5-nitro-2-thiazolyl, 5-bromo-2-thiazolyl, 5-thiocyanato-2-thiazolyl, 4-trifluoromethyl-2-thiazolyl, 4-ethoxycarbonyl-2-thiazolyl, 5-cyano-2-thiazolyl, 5-acetamido-2-thiazolyl, 4-methylsulfonyl-2-thiazolyl, 4-methyl-5-nitro-2-thiazolyl, 2-benzothiazolyl, 6-methylsulfonyl-2-benzothiazolyl, 6-ethoxycarbonyl-2-benzothiazolyl, 6-cyano-2-benzothiazolyl, 6-nitro-2-benzothiazolyl, 6-sulfamoyl-2-benzothiazolyl, 6-thiocyanato-2-benzothiazolyl, 6,N,N-dimethylsulfamoyl-2-benzothiazolyl, 4,6-dichloro-2-benzothiazolyl, 4-methyl-6-nitro-2-benzothiazolyl, 5-methyl-1,3,4-thiadiazol-2-yl, 5-thiocyanato-1,3,4-thiadiazol-2-yl, 5-cyclohexylthio-1,3,4-thiadiazol-2-yl, 5-ethylthio-1,3,4-thiadiazol-2-yl, 5-phenylthio-1,3,4-thiadiazol-2-yl, 5-acetamido-1,3,4-thiadiazol-2-yl, 5-chloro-1,3,4-thiadiazol-2-yl, 5-α-cyanoethylthio-1,3,4-thiadiazoyl-2-yl, 5-ethoxycarbonylmethylthio-1,3,4-thiadiazol-2-yl, 5-phenylsulfonyl-1,3,4-thiadiazol-2-yl, 3-methylsulfonyl-1,2,4-thiadiazol-5-yl, 3-butylthio- 1,2,4-thiadiazol-5-yl, 4-cyano-3-pyrazolyl, 4-nitro-3-pyrazolyl, 4-carbamoyl-3-pyrazolyl, 3-methylsulfonyl-1,2,4-thiadiazol-5-yl, 4,5-dicyano-2-phenylsulfonyl-3-pyrazolyl, 5-methyl-4-nitro-2-phenyl-3-pyrazolyl, 4-cyano-2-methyl-3-pyrazolyl, 4-methoxycarbonyl-2-phenyl-3-pyrazolyl, 5-acetyl-3-nitro-2-thienyl, 5-benzoyl-3-nitro-2-thienyl, 3-nitro-5-p-toluoyl-2-thienyl, 3,5-di(methylsulfonyl)-2-thienyl, 5-methylsulfonyl-3-nitro-2-thienyl, 5-ethylsulfamoyl-3-nitro-2-thienyl, 2-nitro-2-thienyl, 3,5-dinitro-2-thienyl, 5-ethoxycarbonyl-2-thienyl, 4-bromo-3-methyl-5-isothiazolyl, 4-cyano-3-methyl-5-isothiazolyl, 4-ethoxycarbonyl-3-methyl-5-isothiazolyl, 4-chloro-3-methyl-5-isothiazolyl, 3-benzoisothiazolyl, 5-chloro-3-benzoisothiazolyl, 5-nitro-3-benzoisothiazolyl, 5-methylsulfonyl-3-benzoisothiazolyl.

Preferred groups represented by R have the formula

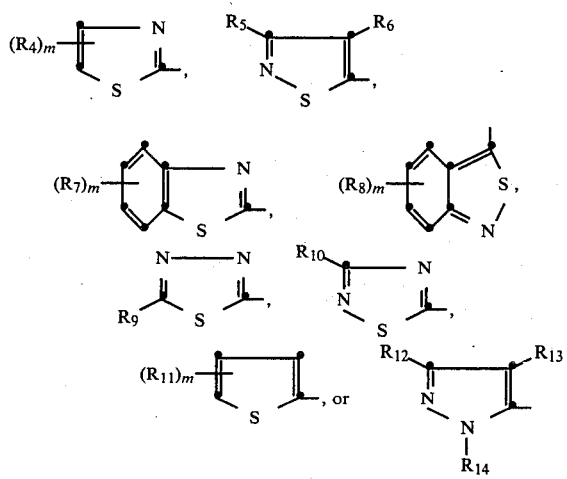

wherein $R_4$ is hydrogen, lower alkyl, lower alkoxy, nitro, halogen, lower alkoxy carbonyl, sulfamoyl, lower alkylsulfamoyl, cyano, thiocyanato, trifluoromethyl, phenyl, or substituted phenyl; $R_5$, $R_6$ and $R_7$ are each selected from nitro, cyano, bromo, hydrogen, chloro, lower alkoxycarbonyl, lower alkyl, lower alkoxy, lower alkylsulfonyl, thiocyanto lower alkylthio, carbamoyl, lower alkylcarbamoyl or lower alkanoyl; $R_8$ is hydrogen, lower alkyl, chlorine, bromine, fluorine, nitro, lower alkoxy, lower alkylsulfonyl, cyano, or lower alkoxycarbonyl; $R_9$ is hydrogen, lower alkyl, lower alkoxy, halogen, lower alkylthio, benzylthio, cyclohexylthio, phenylthio, substituted phenylthio, phenyl, substituted phenyl, benzyl, lower alkylsulfonyl, lower alkanoylamino, lower alkylsulfonamido, benzamido, lower alkoxycarbonyl, lower alkoxycarbonylalkylthio, thiocyanato, sufamoyl, or lower alkylsulfamoyl; $R_{10}$ is lower akylthio, cyclohexylthio, benzylthio, or lower alkylsulfonyl; $R_{11}$ is nitro, hydrogen, lower alkanoyl, benzoyl, substituted benzoyl, cyano, lower alkoxycarbonyl, carbamoyl, lower alkyl carbamoyl, lower alkyl, or phenylsulfonyl; $R_{12}$ is hydrogen, cyano or lower alkyl; $R_{13}$ is cyano, carbamoyl, nitro, or lower alkoxycarbonyl; $R_{14}$ is hydrogen, lower alkyl, phenyl, substituted phenyl, lower alkylsulfonyl, phenylsulfonyl, or substituted phenylsulfonyl; and m is 1 or 2 which may be the same or different.

The novel couplers of this invention are obtained by the reductive alkylation of I with an acetoacetic acid ester II and hydrogen or other reducing agents. The above-described reactions are further illustrated by the following reactions:

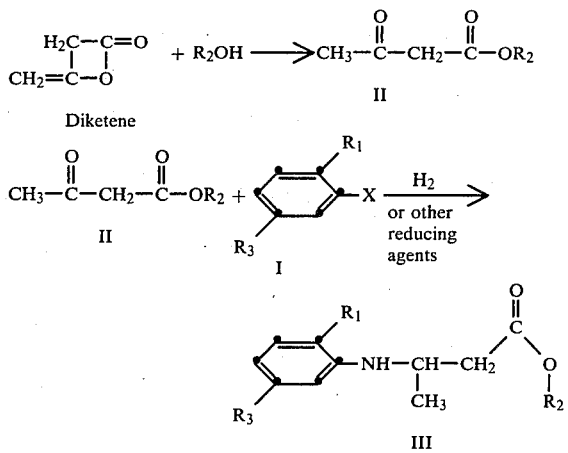

wherein X is $NH_2$ or $NO_2$; $R_1$, $R_2$ and $R_3$ are defined above.

The novel azo compounds of the invention are prepared according to known diazotization of the amine $R-NH_2$ and coupling of the diazonium salt with coupler III.

Preparation of representative couplers and azo compounds of the invention are illustrated by the following examples.

PREPARATION OF THE COUPLERS

EXAMPLE 1

A mixture of 105.0 g (0.5 mole) of 2-nitro-4-acetamidoanisole, 67.0 g (0.5 mole) of ethyl acetoacetate, 550 ml of isopropyl alcohol, 10.0 g of 5% Pt/C, and 3.0 g of p-toluenesulfonic acid is treated in an autoclave at 165° C. with 1,000 psi of hydrogen until the uptake of hydrogen ceases. The solvent and catalyst are removed. Upon standing, 143.8 g (98%) of ethyl 3-(2'-methoxy-5-acetamidophenylamino)butyrate is obtained.

EXAMPLE 2

A mixture of 18.0 g (0.1 mole) of m-nitroacetamido aniline, 26.0 g (0.2 mole) ethyl acetoacetate, 100 ml ethanol, 3.0 g of 5% Pt/C and 0.5 g of p-toluenesulfonic acid is treated in an autoclave at 165° C. and 1,000 psi of hydrogen until the uptake of hydrogen ceases. The solvent and catalyst are removed to yield 19.53 g of ethyl 3-(3'-acetamidophenylamino)butyrate.

EXAMPLE 3

A mixture of 123.0 g (1 mole) of o-anisidine, 260.0 g (2 moles) of ethylacetoacetate, 400 ml of isopropyl alcohol, 10.0 g of 1% Pt/C, 2.5 g of p-toluenesulfonic acid is treated in an autoclave at 165° C., with 1000 psi of hydrogen until the uptake of hydrogen ceases. The catalyst is removed by filtration. The solution is distilled under vacuum to yield 149.0 g of ethyl 3(2'-methoxyphenylamino)butyrate.

EXAMPLE 4

A mixture of 93.0 g (1 mole) of aniline, 260.0 g (2 moles) of ethyl acetoacetate, 500 ml of isopropyl alcohol, 10.0 g of 5% Pt/C, 4.0 g of p-toluenesulfonic acid is treated in an autoclave at 165° C. with 1000 psi of hydrogen until the uptake of hydrogen ceases. The catalyst is removed by filtration. The solution is distilled under vacuum to yield 153.0 g of ethyl(3-phenylamino)-butyrate.

compounds of Table I, and also in the subsequent table refers to polyester fibers dyed with the azo compound.

TABLE I

| Example No. | $R_4$ | $R_1$ | $R_2$ | $R_3$ | Color |
|---|---|---|---|---|---|
| 6 | 5-$NO_2$ | $CH_3$ | $C_2H_5$ | $NHCOCH_3$ | Blue |
| 7 | " | H | " | " | " |
| 8 | " | $OCH_3$ | " | $OCH_3$ | Violet |
| 9 | " | " | " | $CH_3$ | " |
| 10 | " | H | " | " | " |
| 11 | " | " | " | H | " |
| 12 | " | $CH_3$ | " | $CH_3$ | " |
| 13 | H | " | " | H | " |
| 14 | 5-CN | $OCH_3$ | " | " | " |
| 15 | 5-Br | " | $C_2H_4OCH_3$ | $HNCOCH_3$ | " |
| 16 | 4-$CH_3$—5-$NO_2$ | " | $C_2H_4O$—$C_2H_4O$—$C_2H_5$ | " | " |
| 17 | 5-SCN | " | $CH_2$—$C_6H_5$ | H | " |
| 18 | 5-$COOC_2H_5$ | H | $CH_3$ | $CH_3$ | " |
| 19 | 5-$SO_2CH_3$ | " | $C_6H_{11}$ | $OCH_3$ | " |
| 20 | 5-$NHCOCH_3$ | $OCH_3$ | 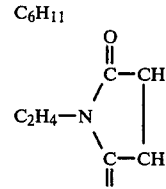 | $NHCOCH_3$ | Blue |
| 21 | 5-$NO_2$ | " | $OCH_3$ | $NHCOC_6H_5$ | " |
| 22 | " | " | " | $NHCOC_7H_{15}$ | " |
| 23 | " | " | " | $HNCOC_6H_{11}$ | " |

PREPARATION OF DYES

EXAMPLE 5

To 2.9 g of 2-amino-5-nitrothiazole, stirred in 25 ml of water, is added 13.6 ml. of concentrated $H_2SO_4$. The solution is cooled to $-10°$ C. and a solution of 1.4 g $NaNO_2$ in 10 ml of concentrated $H_2SO_4$ is added below $-5°$ C. Stirring is continued at about $-5°$ C. for 15 min. The diazonium solution is added for a chilled solution of ethyl 3-(2'-methoxy-5-acetamidophenylamino)butyrate, dissolved in 15% $H_2SO_4$ plus 1:5 acid (5 parts acetic:1 part propionic) at about $0°$ C. The reaction mixture is allowed to stand at $0°$-$5°$ C. for 30 min. and is then drowned in water. The product is collected by filtration, washed with water, and dried in air. The azo compound obtained produces blue shades on polyester fibers and has the structure:

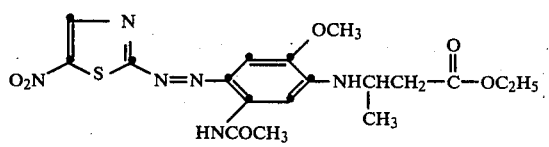

The azo compounds in the examples of Table I which correspond to the formula

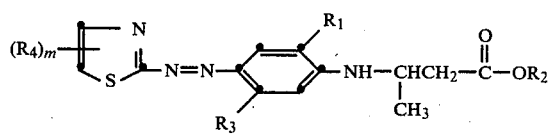

are prepared according to the general procedures described in Example 5. The color given for each of the

EXAMPLE 24

To 3.69 g of 3-amino-4-ethoxy carbonyl-5-methyl-isothiazole in 20 ml of 1-5 acid (1-part propionic to 5-part acetics) is added a solution of 1.44 g of $NaNO_2$ in 10 ml of conc. $H_2SO_4$ portionwise below $0°$ C. Then 20 ml of 1-5 acid is added below $5°$ C. The diazothization is stirred for two hours at $0°$-$5°$ C. and then an aquilot (0.005 mole) is added to a solution of ethyl 3-(2'-methyoxy phenylamino)butyrate (0.005 mole) in 25 ml of 1-5 acid, below $15°$ C. The temperature is kept at $0°$-$5°$ C. for 1 hr. and then the coupling mixture is drowned with water. The product is collected by filtration, washed with water, and air dried. The azo compound obtained gives fast red dyeings on polyester fibers and has the structure:

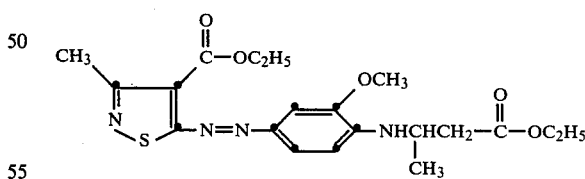

The azo compounds described in examples of Table II are prepared according to the procedures set forth in Example 24. The compounds of Table II conform to the formula

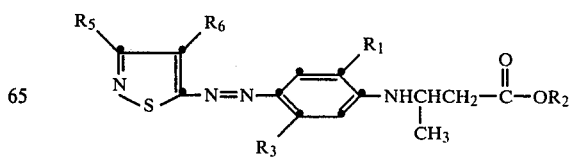

TABLE II

| Example No. | R$_5$ | R$_6$ | R$_1$ | R$_2$ | R$_3$ | Color |
|---|---|---|---|---|---|---|
| 25 | CH$_3$ | O=COC$_2$H$_5$ | OCH$_3$ | C$_2$H$_5$ | HNCOCH$_3$ | Violet |
| 26 | " | " | CH$_3$ | " | " | " |
| 27 | " | " | H | " | " | " |
| 28 | " | " | CH$_3$ | " | H | Red |
| 29 | " | " | " | " | CH$_3$ | " |
| 30 | " | CN | H | " | " | " |
| 31 | " | " | " | " | H | " |
| 32 | " | Br | CH$_3$ | OCH$_3$ | " | " |
| 33 | " | Cl | " | " | " | " |
| 34 | " | NO$_2$ | " | " | " | " |
| 35 | " | O=CNH$_2$ | H | " | " | " |
| 36 | CH$_3$S | Br | CH$_3$ | " | " | " |
| 37 | CH$_3$ | H | " | " | " | Scarlet |
| 38 | " | SCN | " | CH$_2$C$_6$H$_5$ | " | Red |
| 39 | " | O=CCH$_3$ | " | C$_6$H$_{11}$ | " | " |
| 40 | CH$_3$SO$_2$ | Br | " | C$_2$H$_4$OCH$_3$ | " | " |
| 41 | CH$_3$ | O=C—NHC$_2$H$_4$OH | " | OCH$_3$ | " | " |

EXAMPLE 42

To 19.5 g of 2-amino-6-nitrobenzothiazole dissolved in 150 ml of 85% phosphoric acid is added 16.66 ml of 40% nitrosyl sulfuric acid in 33.3 ml of conc. H$_2$SO$_4$ below 5° C. The diazotization is stirred for two hours at 0°–5° C. and then an aquilot (0.005 mole) is added to a solution of ethyl 3-(2′-methylphenylamino)butyrate (0.005 mole) in 25 ml of 2-5 acid, below 15° C. After allowing to couple 1 hr. at 0°–5° C., the dye is drowned in water, filtered, washed with water and air dried. The azo compound obtained imparts bright fast rubine shades to polyester fibers.

The azo compound has the structure

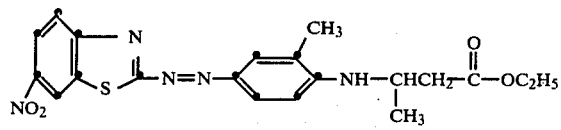

The azo compounds described in examples of Table III are prepared according to the procedures set forth in Example 42. The compounds of Table III conform to the formula

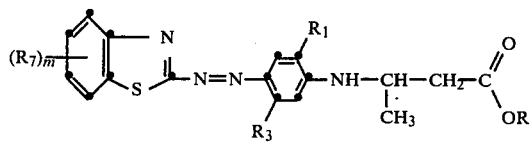

TABLE III

| Example No. | R$_7$ | R$_1$ | R$_2$ | R$_3$ | Color |
|---|---|---|---|---|---|
| 43 | 6-NO$_2$ | H | C$_2$H$_5$ | H | Red |
| 44 | 6-NO$_2$ | OCH$_3$ | " | CH$_3$ | Violet |
| 45 | 6-NO$_2$ | H | " | CH$_3$ | Red |
| 46 | " | OCH$_3$ | " | H | Red |
| 47 | " | OCH$_3$ | " | OCH$_3$ | Violet |
| 48 | " | CH$_3$ | " | NHCOCH$_3$ | " |
| 49 | " | H | " | " | " |
| 50 | 6-SO$_2$CH$_3$ | OCH$_3$ | " | H | Violet |
| 51 | 6-SO$_2$CH$_3$ | H | " | H | Red |
| 52 | 6-SCN | H | CH$_3$ | H | Red |
| 53 | 4,6-di-NO$_2$ | H | " | H | Violet |
| 54 | 4,6-di-Cl | H | " | H | Scarlet |
| 55 | 6-CN | H | C$_2$H$_5$ | CH$_3$ | Red |
| 56 | 4-CF$_3$ | H | C$_2$H$_4$OCH$_3$ | " | " |
| 57 | 6-SO$_2$NH$_2$ | OCH$_3$ | C$_2$H$_5$ | H | Red |
| 58 | 6-COOC$_2$H$_5$ | " | " | " | Red |

EXAMPLE 59

To 19.5 g of 3-amino-2,1-benzoisothiazole dissolved in 200 ml of 1-5 acid and 100 ml of conc. H$_2$SO$_4$ is added a solution of 7.2 g of NaNO$_2$ in 50 ml of conc. H$_2$SO$_4$, all at 0°–5° C. After the diazotizing at 0°–5° C. for two hours, an anquilot (0.005 mole) of the solution is added to a chilled solution of ethyl-3-(2′-methoxy-5′-acetamidophenylamino)butyrate (0.005 mole) in 25 ml of 1-5 acid, all below 15° C. The coupling is buffered with ammonium acetate until it is neutral to Congo red paper. After coupling 2 hrs. at 0°–5° C., the reaction is drowned in water. The product is collected by filtration, washed with water, and dried in air. The azo compound obtained colors polyester fibers bright blue shades and has the following structure:

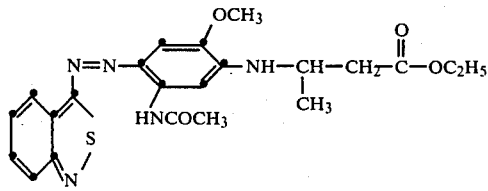

The azo compounds described in examples of Table IV are prepared according to the procedures set forth in Example 59. The compounds of Table IV conform to the formula

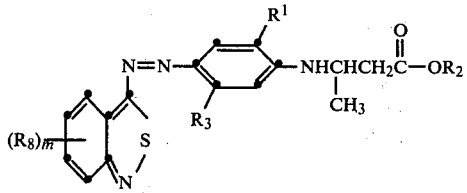

TABLE IV

| Example No. | $R_8$ | $R_1$ | $R_2$ | $R_3$ | Color |
|---|---|---|---|---|---|
| 60 | H | $CH_3$ | $C_2H_5$ | $HNCOCH_3$ | Blue |
| 61 | H | H | " | " | Blue |
| 62 | 5-$NO_2$ | $OCH_3$ | " | " | Blue |
| 63 | 5-$NO_2$ | $OCH_3$ | " | H | Violet |
| 64 | 5-$NO_2$ | $CH_3$ | " | H | " |
| 65 | 5-$NO_2$ | H | " | H | Violet |
| 66 | 5-CN | $OCH_3$ | " | $NHCOCH_3$ | Blue |
| 67 | 5-Cl | " | " | " | Blue |
| 68 | 5-$SO_2CH_3$ | " | " | " | Blue |
| 69 | 5-$CH_3$ | $OCH_3$ | " | $CH_3$ | Violet |
| 70 | 5-$NO_2$ | $OCH_3$ | $CH_3$ | $HNCOCH_3$ | Blue |

Example 71

Sodium nitrite (0.72 g.) is added portionwise to 5 ml. of conc. $H_2SO_4$. The solution is cooled and 10 ml. of 1:5 acid is added below 15° C. The mixture is cooled further and 1.47 g. 2-amino-5-methylthio-1,3,4-thiadiazole is added followed by 10 ml. 1:5 acid, all below 5° C. After stirring for 2 hrs. at 0°–5° C., the diazonium solution is added to a chilled solution of ethyl-3-(3'-acetamidophenylamino)butyrate, 25 ml. of 1:5 acid below 5° C. The reaction is kept cold and ammonium acetate added until the coupling mixture is neutral to Congo Red test paper. After allowing to couple 1 hr. at about 5° C., the reaction mixture is drowned in water. The product is collected by filtration, washed with water, and dried in air. The dye produces bright red shades on polyester fibers and has good lightfastness and resistance to sublimation. This azo compound has the structure

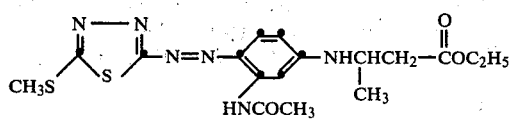

The compounds of the invention having a 1,2,4-thiadiazol-5-yl diazo component are prepared by substituting the isomeric 5-amino-1,2,4-thiadiazole for the 2-amino-1,3,4-thiadiazoles employed in Example 71. For example, when 1.47 g. 5-amino-3-methylthio-1,2,4-thiadiazole is diazotized and coupled with ethyl-3-(3'-acetamidophenylamino) butyrate as described in Example 71 the azo compound having the formula

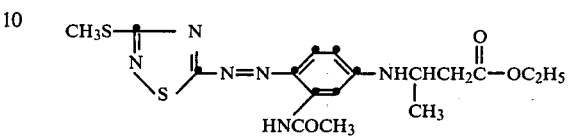

is obtained. The compound imparts bright, fast red shades to polyester fibers.

The azo compounds described in the examples of Table V are prepared by the procedure employed in Example 71. These compounds conform to the general formula

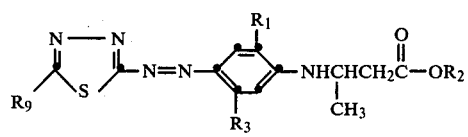

TABLE V

| Example No. | $R_9$ | $R_1$ | $R_2$ | $R_3$ | Color |
|---|---|---|---|---|---|
| 72 | —$SC_2H_5$ | $CH_3$ | $C_2H_5$ | $HNCOCH_3$ | Red |
| 73 | —$SC_2H_5$ | $OCH_3$ | " | H | Scarlet |
| 74 | —$C_6H_5$ | H | " | $HNCOCH_3$ | Red |
| 75 | —$SC_2H_5$ | H | $CH_3$ | H | Scarlet |
| 76 | —$C_6H_5$ | $CH_3$ | " | H | " |
| 77 | —$SC_2H_5$ | $OCH_3$ | " | $CH_3$ | " |
| 78 | —$SO_2CH_3$ | H | $C_2H_4OCH_3$ | H | Red |
| 79 | —Br | $OCH_3$ | $C_2H_4OC_2H_4OC_2H_5$ | H | Scarlet |
| 80 | —$SC_6H_{11}$ | H | " | $CH_3$ | " |
| 81 | —$SC_2H_4OH$ | H | " | " | " |
| 82 | —$SC_2H_4CN$ | H | " | " | " |
| 83 | —$CH_3$ | H | $C_2H_5$ | $HNCOCH_3$ | " |
| 84 | —SCN | H | " | " | Red |
| 85 | —$SCH_2C_6H_5$ | H | " | " | " |
| 86 | H | " | " | " | Scarlet |

When $R^9$ is alkylthio, cyclohexylthio, or alkylsulfonyl, the isomeric 1,2,4-thiadiazol-5-ylazo compounds are prepared by the same procedure as mentioned hereinabove. These isomeric compounds give dyeings on polyester fibers substantially identical in color fastness properties and slightly redder in shade as those produced by the corresponding 1,3,4-thiadiazol-2-ylazo compounds.

Example 87

To 5 ml. of conc. $H_2SO_4$ is added portionwise 0.72 g. of $NaNO_2$ with stirring. The nitrosyl sulfuric acid solution is cooled and 10 ml. of 1:5 acid (1 part propionic:5 parts acetic) is added below 15° C. To this is added 2.00 g. 2-amino-3-nitro-5-propionylthiophene followed by 10 ml. of 1:5 acid, all at 0°–5° C. The reaction is stirred at 0°–5° C. for 1 hr. The diazonium solution was added to a chilled solution of ethyl-3-(2'-methoxy-5'-acetamidophenylamino)butyrate (0.01 mole) dissolved in 25 ml. of 1:5 acid. The coupling mixture is stirred occasionally for 1 hr., and is then drowned with water.

The azo compound is collected by filtration, washed with water, and air dried.

The structure of the dye is:

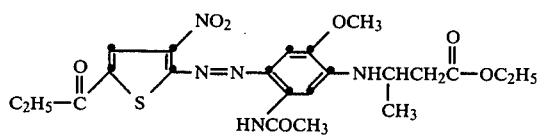

The azo compounds described in the examples of Table VI are prepared by the procedure employed in Example 87. These compounds conform to the general formula:

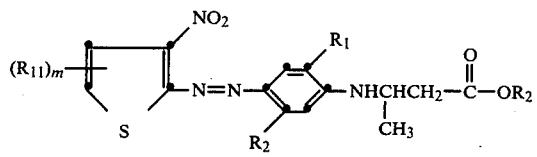

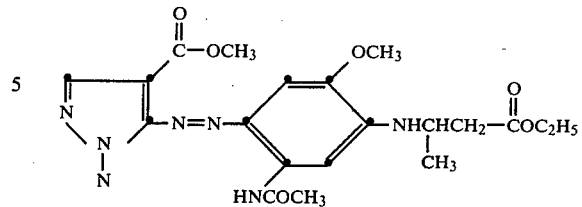

The azo compounds described in the examples of Table VII are prepared by the procedure employed in Example 103. These compounds give yellow dyeings on polyester fibers and conform to the formula

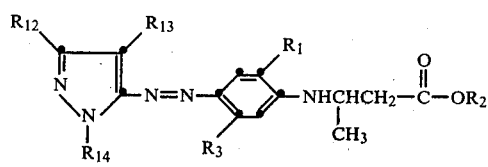

TABLE VI

| Example No. | $R_{11}$ | $R_1$ | $R_2$ | $R_3$ | Color |
|---|---|---|---|---|---|
| 88 | 5-CH$_3$CO—3-NO$_2$ | OCH$_3$ | C$_2$H$_5$ | HNCOCH$_3$ | Turquoise |
| 89 | " | CH$_3$ | C$_2$H$_5$ | HNCOCH$_3$ | Blue |
| 90 | " | H | " | " | Blue |
| 91 | " | H | " | CH$_3$ | Violet |
| 92 | " | OCH$_3$ | " | CH$_3$ | Blue |
| 93 | " | H | " | H | Violet |
| 94 | 5-CN—3-CCH$_3$ (C=O) | OCH$_3$ | " | NHCOCH$_3$ | Violet |
| 95 | 5-(CH$_3$)$_2$CH—C(=O)—3-CN | " | " | " | " |
| 96 | 5-(CH$_3$)$_2$CH—C(=O)—3-COC$_2$H$_5$ | " | " | " | " |
| 97 | 5-CN-3-CN | " | " | " | " |
| 98 | 3,5-di-SO$_2$CH$_3$ | " | " | " | " |
| 99 | 3,5-di-NO$_2$ | " | " | " | " |
| 100 | 5-(CH$_3$)$_2$CHC(=O)—3-C(=O)—NHC$_2$C$_4$OH | " | " | " | Turquoise Blue |
| 101 | 3-NO$_2$ | " | " | " | Blue |
| 102 | 5-C$_2$H$_5$OOC—3-NO$_2$ | " | " | " | Turquoise |

Example 103

Ten ml. of 1:5 acid (1 part propionic:5 parts acetic) are added to a solution of nitrosylsulfuric acid prepared from sodium nitrite (0.72 g.) and sulfuric acid (5 ml.). The solution is cooled to 3° C. and 3-aminopyrazole-4-carboxylic acid methyl ester (1.41 g.) is added below 5° C. followed by a second portion of 1:5 acid (10 ml.) at the same temperature. The diazotization is completed by stirring for two hours at 3°-5° C. This diazo solution is added to a cooled solution of ethyl-3-(2'-methoxy-5'-acetamidophenylamino)butyrate (0.01 mole) in 1:5 acid (100 ml.). The mineral acid is neutralized by the addition of solid ammonium acetate maintaining the temperature at 10° C. or below. When the coupling is complete, water (500 ml.) is added with good stirring. The precipitated yellow solid is collected and washed well with water. The azo compound imparts yellow shades to polyester fibers and has the structure:

TABLE VII

| Example No. | $R_{12}$ | $R_{13}$ | $R_{14}$ | $R_1$ | $R_2$ | $R_3$ |
|---|---|---|---|---|---|---|
| 104 | H | CN | H | OCH$_3$ | C$_2$H$_5$ | HNCOCH$_3$ |
| 105 | CN | CN | H | CH$_3$ | " | " |
| 106 | H | NO$_2$ | H | H | " | " |
| 107 | CH$_3$ | CN | CH$_3$ | H | " | CH$_3$ |
| 108 | H | —COOCH$_3$ | " | H | CH$_3$ | H |
| 109 | " | CO$_2$C$_2$H$_5$ | " | " | " | " |
| 110 | " | CO$_2$NH$_2$ | H | CH$_3$ | C$_2$H$_5$ | " |
| 111 | H | CO$_2$C$_2$H$_5$ | C$_6$H$_5$ | CH$_3$ | " | " |
| 112 | H | CONH$_2$ | SO$_2$C$_2$H$_5$ | H | " | H |
| 113 | H | CO$_2$C$_2$H$_5$ | SO$_2$C$_6$H$_5$ | H | " | CH$_3$ |

The invention has been described in detail with particular reference to certain preferred embodiments thereof, but it will be understood that variations and modifications can be effected within the spirit and scope of the invention.

I claim:

1. A compound of the formula

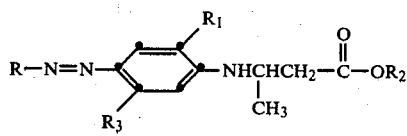

wherein
R is a heterocyclic radical which may be substituted, selected from 2-thiazolyl, 2-benzothiazolyl, 3-benzoisothiazolyl, 1,3,4-thiadiazol-2-yl, 1,2,4-thiadiazol-5-yl, 3-pyrazolyl, 2-thienyl, and 5-isothiazolyl;

$R_1$ is hydrogen, lower alkyl, or lower alkoxy;

$R_2$ is lower alkyl, cyclohexyl, benzyl, or phenyl;

$R_3$ is hydrogen, lower alkyl, lower alkoxy, alkanoylamino wherein the alkanoyl moiety is either straight or branched lower alkyl aroylamino, or cyclohexyl carbonylamino; and wherein each of the alkyl moieties may be substituted with 1-3 of lower alkoxy, $-O-C_2H_4-O-C_2H_4O-$lower alkyl,

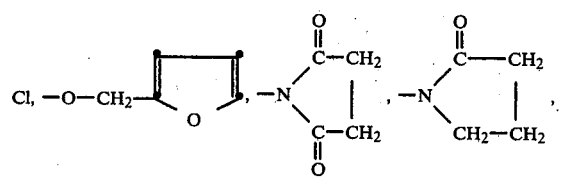

phenyl, phenoxy, cyclohexyl, cyclohexyloxy, NHCO—lower alkyl, —N(lower alkyl)$_2$, acyloxy,

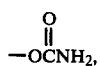

—S—lower alkyl, or —SO$_2$ lower alkyl.

2. The compound of claim 1 wherein R is selected from radicals of the formula

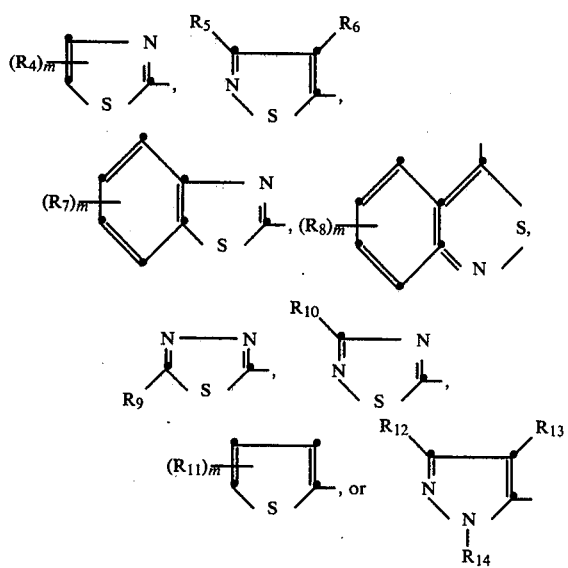

wherein $R_4$ is hydrogen, lower alkyl, lower alkoxy, nitro, halogen, lower alkoxycarbonyl, sulfamoyl, lower alkylsulfamoyl, cyano, thiocyanato, trifluoromethyl, phenyl, or substituted phenyl; $R_5$, $R_6$ and $R_7$ are each selected from nitro, cyano, bromo, hydrogen, chloro, lower alkoxycarbonyl, lower alkyl, lower alkoxy, lower alkylsulfonyl, thiocyanto lower alkylthio, carbamoyl, lower alkylcarbamoyl or lower alkanoyl; $R_8$ is hydrogen, lower alkyl, chlorine, bromine, fluorine, nitro, lower alkoxy, lower alkylsulfonyl, cyano, or lower alkoxycarbonyl; $R_9$ is hydrogen, lower alkyl, lower alkoxy, halogen, lower alkylthio, benzylthio, cyclohexylthio, phenylthio, substituted phenylthio, phenyl, substituted phenyl, benzyl, lower alkylsulfonyl, lower alkanoylamino, lower alkylsulfonamido, benzamido, lower alkoxycarbonyl, lower alkoxycarbonylalkylthio, thiocyanato, sufamoyl, or lower alkylsulfamoyl; $R_{10}$ is lower alkylthio, cyclohexylthio, benzylthio, or lower alkylsulfonyl; $R_{11}$ is nitro, hydrogen, lower alkanoyl, benzoyl, substituted benzoyl, cyano, lower alkoxycarbonyl, carbamoyl, lower alkylcarbamoyl, lower alkyl, or phenylsulfonyl; $R_{12}$ is hydrogen, cyano or lower alkyl; $R_{13}$ is cyano, carbamoyl, nitro, or lower alkoxycarbonyl; $R_{14}$ is hydrogen, lower alkyl, phenyl, substituted phenyl, lower alkylsulfonyl, phenylsulfonyl, or substituted phenylsulfonyl; and m is 1 or 2 which may be the same or different.

3. The compound according to claim 1 having the formula

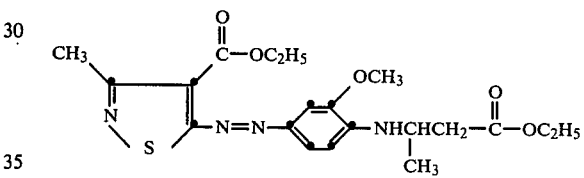

4. The compound according to claim 1 having the formula

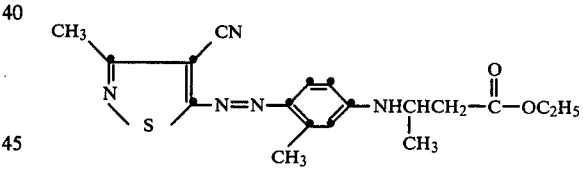

5. The compound according to claim 1 having the formula

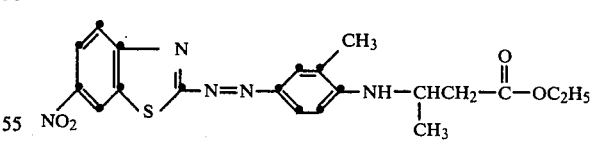

6. The compound according to claim 1 having the formula

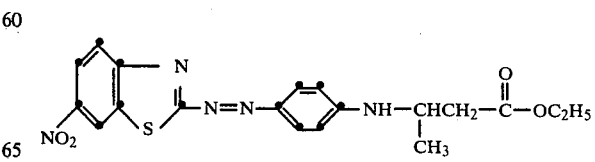

7. The compound according to claim 1 having the formula

8. The compound according to claim 1 having the formula
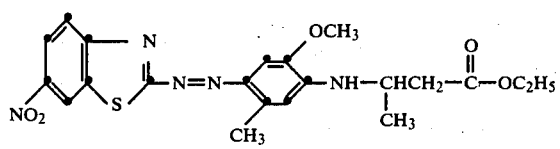
9. The compound according to claim 1 having the formula
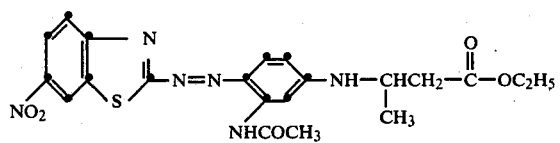
10. The compound according to claim 1 having the formula
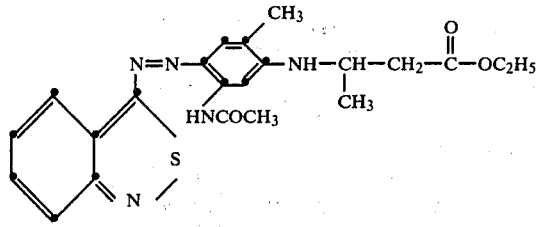
11. The compound according to claim 1 having the formula
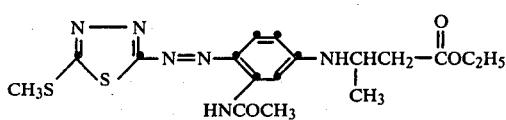
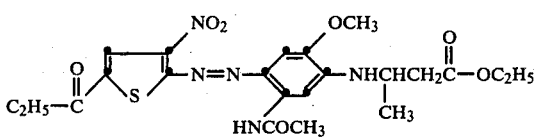
* * * * *

UNITED STATES PATENT AND TRADEMARK OFFICE
CERTIFICATE OF CORRECTION

PATENT NO. : 4,271,071
DATED : June 2, 1981
INVENTOR(S) : Gary T. Clark

It is certified that error appears in the above—identified patent and that said Letters Patent is hereby corrected as shown below:

Column 13, line 18, "alkyl" should read ---alkyl,---.

Column 13, line 50, the structure

" 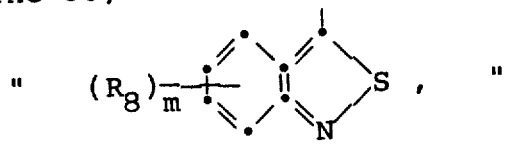 "

should read

--- 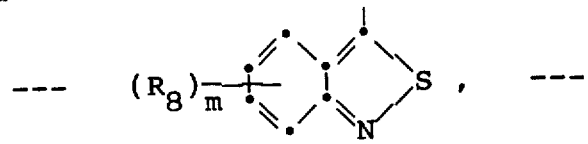 ---

Signed and Sealed this

Eighteenth Day of January 1983

[SEAL]

Attest:

GERALD J. MOSSINGHOFF

Attesting Officer

Commissioner of Patents and Trademarks